United States Patent
Hsu et al.

(10) Patent No.: US 11,329,559 B2
(45) Date of Patent: May 10, 2022

(54) LOW DROPOUT REGULATOR AND CONTROL METHOD THEREOF

(71) Applicant: NANYA TECHNOLOGY CORPORATION, New Taipei (TW)

(72) Inventors: Hao-Huan Hsu, Taoyuan (TW); Lin-Chen Yen, Taipei (TW)

(73) Assignee: NANYA TECHNOLOGY CORPORATION, New Taipei (TW)

(*) Notice: Subject to any disclaimer, the term of this patent is extended or adjusted under 35 U.S.C. 154(b) by 45 days.

(21) Appl. No.: 17/000,383

(22) Filed: Aug. 24, 2020

(65) Prior Publication Data

US 2022/0060110 A1    Feb. 24, 2022

(51) Int. Cl.
| | | |
|---|---|---|
| *G05F 1/595* | (2006.01) | |
| *G05F 1/575* | (2006.01) | |
| *G05F 1/59* | (2006.01) | |
| *H02M 3/158* | (2006.01) | |
| *H02M 1/084* | (2006.01) | |

(52) U.S. Cl.
CPC ............ *H02M 3/158* (2013.01); *G05F 1/575* (2013.01); *H02M 1/084* (2013.01); *G05F 1/59* (2013.01); *G05F 1/595* (2013.01)

(58) Field of Classification Search
CPC .............. G05F 1/595; G05F 1/575; G05F 1/59
See application file for complete search history.

(56) References Cited

U.S. PATENT DOCUMENTS

| | | | | |
|---|---|---|---|---|
| 6,281,667 B1 * | 8/2001 | Matsumura | ............ | G05F 1/565 |
| | | | | 323/274 |
| 9,600,007 B2 * | 3/2017 | Su | ........................ | G05F 1/575 |
| 9,684,325 B1 * | 6/2017 | Rasmus | .................. | G05F 1/575 |
| 9,977,444 B1 * | 5/2018 | Kong | ...................... | G05F 1/563 |
| 10,545,523 B1 * | 1/2020 | Wu | ......................... | G05F 1/618 |
| 11,079,785 B2 * | 8/2021 | Hashiguchi | ............ | G05F 1/575 |
| 2010/0097042 A1 * | 4/2010 | Hsieh | ..................... | G05F 1/573 |
| | | | | 323/282 |
| 2012/0262138 A1 * | 10/2012 | Srinivasan | ............. | G05F 1/575 |
| | | | | 323/279 |
| 2015/0015224 A1 * | 1/2015 | Yasusaka | ................ | G05F 1/575 |
| | | | | 323/280 |
| 2016/0202714 A1 | 7/2016 | Luria et al. | | |

(Continued)

FOREIGN PATENT DOCUMENTS

| | | | | | |
|---|---|---|---|---|---|
| TW | | 200825651 A | | 6/2008 | |
| WO | WO-2008026420 A1 * | | 3/2008 | ............... | G05F 1/56 |
| WO | WO-2020086150 A2 * | | 4/2020 | ............. | G05F 1/575 |

*Primary Examiner* — Sisay G Tiku

(74) *Attorney, Agent, or Firm* — CKC & Partners Co., LLC

(57) ABSTRACT

A low dropout regulator is disclosed. The low dropout regulator includes an amplifier, a first transistor, a second transistor and a switch. When a supply voltage value of the low dropout regulator is less than a supply voltage threshold value, a first path of the switch is selected and a first switch voltage value is transmitted to the first transistor so as to fully conduct the first transistor, and an output voltage value of the low dropout regulator is equal to the supply voltage value. When the supply voltage value is not less than the supply voltage threshold value, a second path of the switch is selected and a second switch voltage value is transmitted to the first transistor so as to turn off the first transistor, and the output voltage value is adjusted by the second transistor and the amplifier.

13 Claims, 4 Drawing Sheets

(56) References Cited

U.S. PATENT DOCUMENTS

2016/0299518 A1* 10/2016 Iwata ................. G05F 1/468
2019/0220074 A1* 7/2019 Muthukaruppan ....... G05F 1/59
2019/0278314 A1* 9/2019 Hashiguchi .......... B60L 3/0046
2021/0311516 A1* 10/2021 Pan ................... G05F 1/575

* cited by examiner

LOW DROPOUT REGULATOR AND CONTROL METHOD THEREOF

BACKGROUND

Technical Field

The present disclosure relates to a low dropout regulator and a control method thereof. More particularly, the present disclosure relates to a low dropout regulator and a control method thereof for maintaining the output voltage value of the low dropout regulator.

Description of Related Art

The common supply voltage value of the low dropout regulator (LDO) was 1.2 V. However, when the supply voltage value became lower than default value. It induced larger error of LDO output voltage value and provided smaller driving current. When the supply voltage value was close to the target LDO output voltage value, for example, when the difference between the supply voltage value and the target LDO output voltage value, the previous design was difficult to maintain target LDO output voltage value.

In some design, an analog switch is implemented so as to control a voltage value input to the gate terminal of the pass transistor of the LDO, and the output voltage value is adjusted by controlling the conductivity of the pass transistor with the voltage value input to the gate terminal of the pass transistor. However, in the previous design, when there is a switching at the control signal of the analog switch, a large output voltage drop of LDO is induced, and a long response time to reach the target output voltage is in need when the large output voltage drop of LDO is induced.

SUMMARY

An aspect of the present disclosure is to provide a low dropout regulator. The low dropout regulator includes an amplifier, a first transistor, a second transistor and a switch. The second transistor is coupled to the amplifier and the first transistor. The switch is coupled to the first transistor. When a supply voltage value of the low dropout regulator is less than a supply voltage threshold value, a first path of the switch is selected and a first switch voltage value is transmitted to the first transistor so as to fully conduct the first transistor, and an output voltage value of the low dropout regulator is equal to the supply voltage value. When the supply voltage value is not less than the supply voltage threshold value, a second path of the switch is selected and a second switch voltage value is transmitted to the first transistor so as to turn off the first transistor, and the output voltage value is adjusted by the second transistor and the amplifier.

Another aspect of the present disclosure is to provide a control method of a low dropout regulator. The control method includes the following operations: transmitting a first switch voltage value to a first transistor so as to fully conduct the first transistor when a supply voltage value is less than a supply voltage threshold value, so that an output voltage value is equal to the supply voltage value; and transmitting a second switch voltage value to the first transistor so as to turn off the first transistor when the supply voltage value is not less than the supply voltage threshold value, so that the output voltage value is adjusted by a second transistor and an amplifier.

In sum, the embodiments of the present disclosure are to provide a low dropout regulator and a control method thereof, so as to maintain the LDO output voltage value when the supply voltage value is close to the target LDO output voltage value. By using a switch to control the voltage value input to the gate terminal of the pass transistor of the LDO, a large output voltage drop of the LDO is avoided when there is a switching at the control signal of the switch.

BRIEF DESCRIPTION OF THE DRAWINGS

The present disclosure can be more fully understood by reading the following detailed description of the embodiment, with reference made to the accompanying drawings as follows.

DETAILED DESCRIPTION

In order to make the description of the disclosure more detailed and comprehensive, reference will now be made in detail to the accompanying drawings and the following embodiments. However, the provided embodiments are not used to limit the ranges covered by the present disclosure; orders of step description are not used to limit the execution sequence either. Any devices with equivalent effect through rearrangement are also covered by the present disclosure.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

In this document, the term "coupled" may also be termed as "electrically coupled," and the term "connected" may be termed as "electrically connected." "Coupled" and "connected" may also be used to indicate that two or more elements cooperate or interact with each other.

Figure 1:
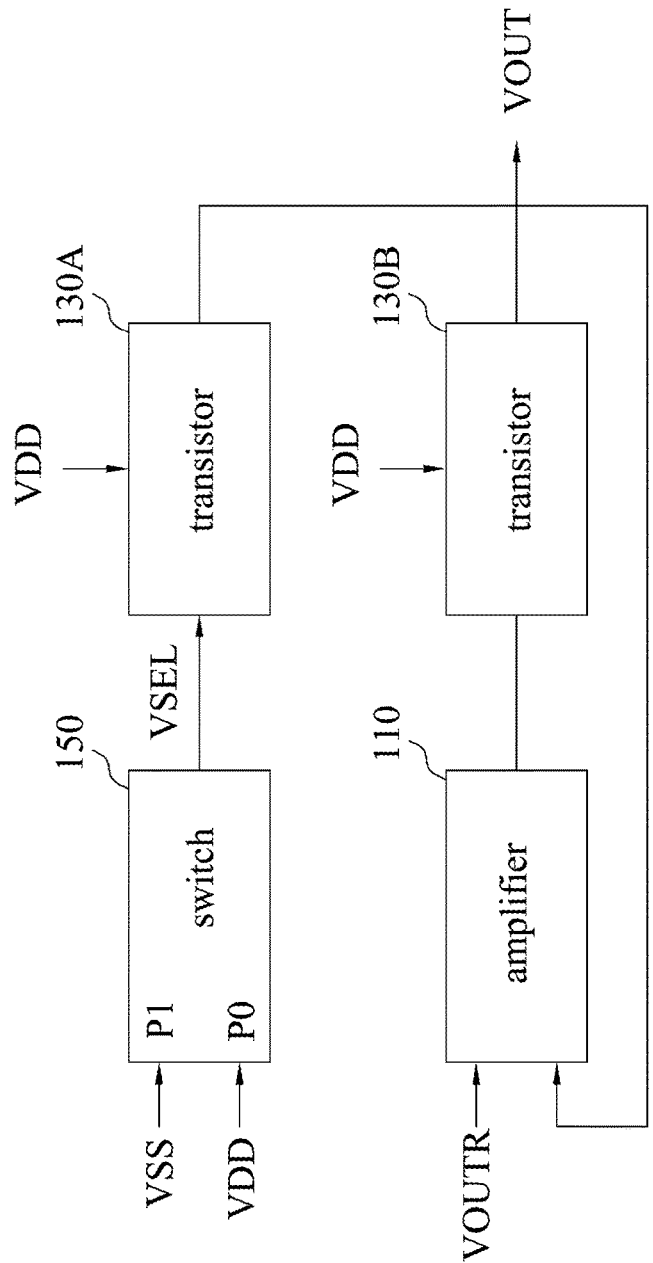
FIG. 1 is a schematic diagram of a low dropout regulator according to some embodiments of the present disclosure.

Reference is made to FIG. 1. FIG. 1 is a schematic diagram of a low dropout regulator (LDO) 100 according to some embodiments of the present disclosure. The low dropout regulator 100 includes an amplifier 110, a switch 150, a transistor 130A and a transistor 130B. In the connection relationship, the amplifier 110 is coupled to the transistor 130B, and the transistor 130A is coupled to the transistor 130B and the switch 150. The LDO as illustrated in FIG. 1 is for illustrative purposes only, and the embodiments of the present disclosure are not limited thereto.

In some embodiments, when a supply voltage value VDD of the transistor 130 is less than a supply voltage threshold value, a path P1 of the switch 150 is selected, and a switch voltage value VSEL with the voltage value VSS is transmitted to the transistor 130A through the path P1. In some embodiments, when the transistor 130A is a p-type transistor and the voltage value VSS is 0, the transistor 130A is fully conducted, and an output voltage value VOUT is equal to the supply voltage value VDD.

On the other hand, in some embodiments, when the supply voltage value VDD of the transistor 130 is not less than the supply voltage threshold value, a path P0 of the switch 150 is selected, and a switch voltage value VSEL with the supply voltage value VDD is transmitted to the transistor 130A through the path P0. In some embodiments, when the transistor 130A is a p-type transistor, the transistor 130A is turned off, and the output voltage value VOUT is adjusted by the amplifier 110 and the transistor 130B.

Figure 2:
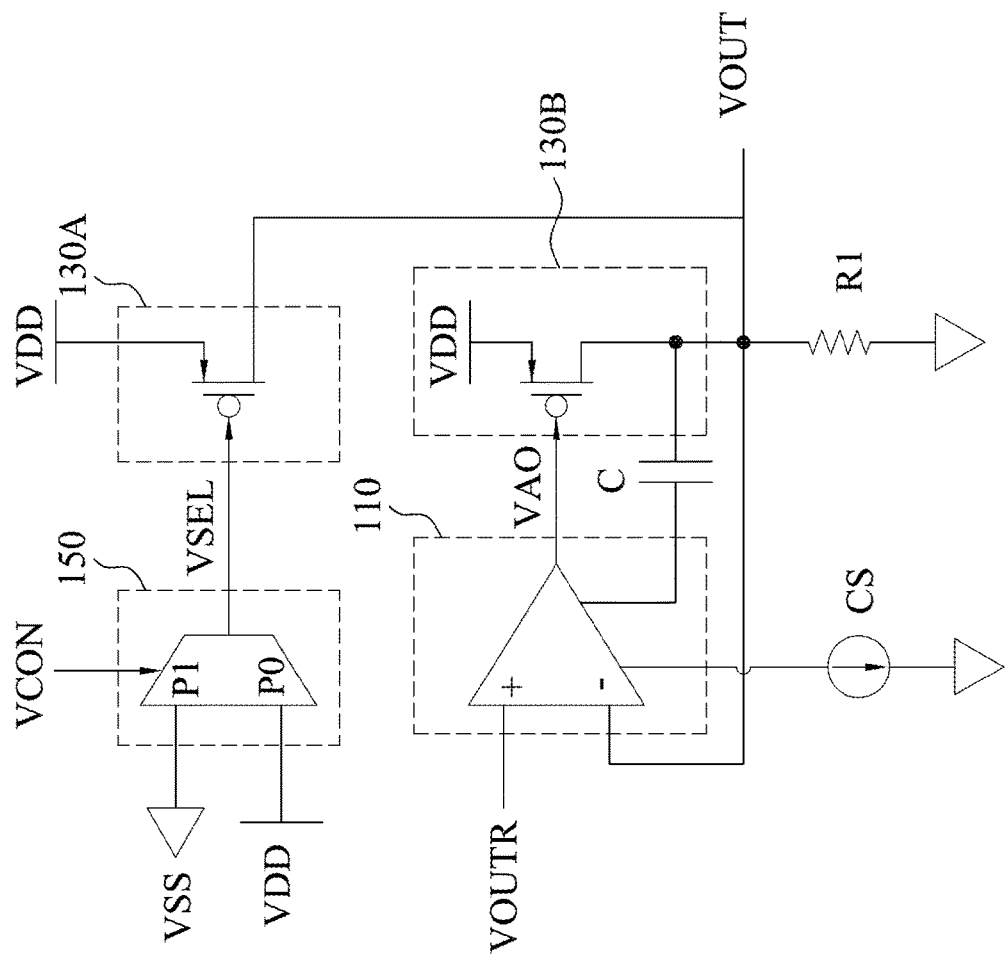
FIG. 2 is a schematic diagram of a low dropout regulator according to some embodiments of the present disclosure.

Reference is made to FIG. 2. FIG. 2 is a schematic diagram of a low dropout regulator (LDO) 200 according to some embodiments of the present disclosure.

As illustrated in FIG. 2, in some embodiments, the switch 150 includes path P1 and path P0. Path P1 receives the voltage value VSS, and path P0 receives the supply voltage value VDD. The switch 150 outputs the switch voltage value VSEL. The switch 150 is controlled by the control voltage value VCON. In some embodiments, the switch 150 is implemented as an analog multiplexer. However, the embodiments of the present disclosure are not limited thereto.

As illustrated in FIG. 2, in some embodiments, the transistor 130A is a p-type transistor. It should be noted that, the p-type transistor in the embodiments of the present disclosure is for illustrative purposes only, other transistors, such as n-type transistors, may be included within the scope of the present disclosure.

A first end of the transistor 130A receives the supply voltage value VDD, a second end of the transistor 130 outputs the output voltage value VOUT, and a control end of the transistor 130 receives the switch voltage value VSEL.

When the switch voltage value VSEL with a voltage value of VSS is input to the control end of the transistor 130A and the voltage value of VSS is 0, the transistor 130A is fully conducted, and an output voltage value VOUT is equal to the supply voltage value VDD. On the other hand, when the switch voltage value VSEL with the supply voltage value VDD is transmitted to the transistor 130A, the transistor 130A is turned off, and the output voltage value VOUT is adjusted by the amplifier 110 and the transistor 130B.

Figure 3:
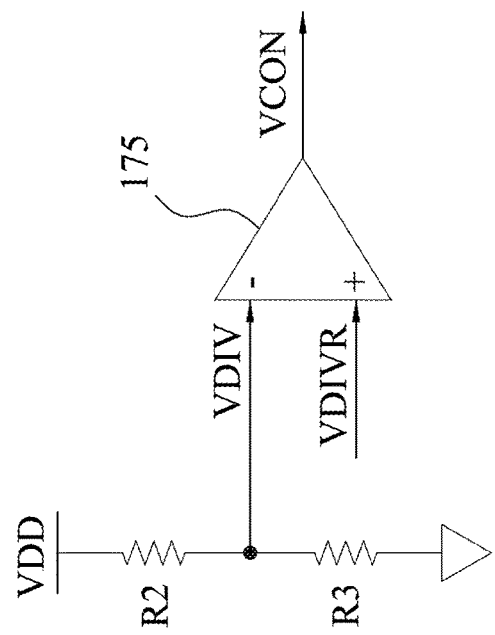
FIG. 3 is a schematic diagram of a control circuit according to some embodiments of the present disclosure.

Reference is made to FIG. 3. FIG. 3 is a schematic diagram of a control circuit 170 according to some embodiments of the present disclosure. In some embodiments, the LDO 200 further includes a control circuit 170. The control circuit 170 is coupled to the switch 150, and the control circuit 170 is configured to output the control voltage value VCON to the switch 150.

As illustrated in FIG. 3, in some embodiments, the control circuit 170 includes a comparator 175, a resistor R2, and a resistor R3. A first input end of the comparator 175 receives a voltage division value VDIV of the supply voltage value VDD. A second input end of the comparator 175 receives an internal reference voltage value VDIVR.

In some embodiments, when the voltage division value VDIV is less than the internal reference voltage value VDIVR, the comparator 175 outputs the control voltage value VCON with the value of 1, and the path P1 of the switch 150 as illustrated in FIG. 2 is conducted. On the other hand, when the voltage division value VDIV is not less than the internal reference voltage value VDIVR, the comparator 175 outputs the control voltage value VCON with the value of 0, and the path P0 of the switch 150 as illustrated in FIG. 2 is conducted.

Reference is made to FIG. 2 again. In some embodiments, when the supply voltage value VDD is less than the supply voltage threshold value, the control circuit 170 as illustrated in FIG. 3 outputs the control voltage value VCON with the value of 1, and the path P1 of the switch 150 is conducted, and the path P0 of the switch 150 is not conducted. On the other hand, when the supply voltage value VDD is not less than the supply voltage threshold value, the control circuit 170 outputs a control voltage value VCON with a value of 0, and the path P0 of the switch 150 is conducted and the path P1 of the switch 150 is not conducted.

As illustrated in FIG. 2, in some embodiments, a first input end of the amplifier 110 receives the output voltage threshold value VOUTR, a second input end of the amplifier receives the output voltage value VOUT, and an output end of the amplifier outputs the amplifier output value VAO.

In some embodiments, the transistor 130B is a p-type transistor. It should be noted that, the p-type transistor in the embodiments of the present disclosure is for illustrative purposes only, other transistors, such as n-type transistors, may be included within the scope of the present disclosure.

A first end of the transistor 130B receives the supply voltage value VDD, a second end of the transistor 130 outputs the output voltage value VOUT, and a control end of the transistor 130 receives the amplifier output value VAO.

In some embodiments, when the output voltage value VOUT is less than the output voltage threshold value VOUTR, the amplifier output value VAO input to the switch 150 from the amplifier 110 decreases, and then the output voltage value VOUT rises. On the other hand, when the output voltage value VOUT is greater than the output voltage threshold value VOUTR, the amplifier output value VAO input to the switch 150 from the amplifier 110 increases, and then the output voltage value VOUT falls.

In some embodiments, a conductivity level of the transistor 130 is in inverse proportional to the amplifier output value VAO, so as to achieve the feature mentioning above. In detail, when the amplifier output value VAO decreases, the conductivity level of the transistor 130B is high. On the other hand, when the amplifier output value VAO increases, the conductivity level of the transistor 130B is low.

Furthermore, in some embodiments, the LDO 200 further includes a capacitor C connected between the amplifier 110 and the transistor 130B. In some embodiments, the LDO 200 further includes a resistance R1 connected to the second end of the transistor 130B. In some embodiments, the LDO 200 further includes a current source CS connected to the amplifier 110.

Figure 4:
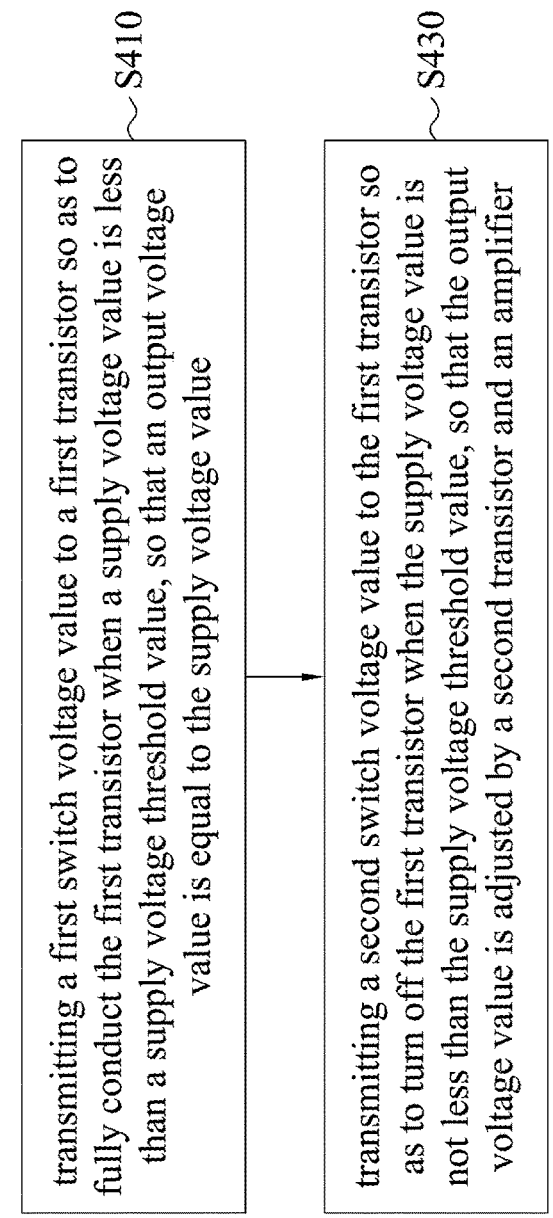
FIG. 4 is a flowchart illustrating the control method in accordance with some embodiments of the present disclosure.

Reference is made to FIG. 4. FIG. 4 is a flowchart illustrating the control method 400 in accordance with some embodiments of the present disclosure. It should be noted that the control method 400 can be applied to an electrical device having a structure that is the same as or similar to the structure of the low dropout regulator 100 shown in FIG. 1 and the low dropout regulator 200. To simplify the description below, the embodiments shown in FIG. 1 will be used as an example to describe the control method 400 according to some embodiments of the present disclosure. However, the present disclosure is not limited to application to the embodiments shown in FIG. 1, and FIG. 2. As shown in FIG. 4, the control method 400 includes operations S410 and S430.

In operation S410, transmitting a first switch voltage value to a first transistor so as to fully conduct the first transistor when a supply voltage value is less than a supply voltage threshold value, so that an output voltage value is equal to the supply voltage value. In some embodiments, operation S410 may be operated by the switch 150 as illustrated in FIG. 2.

For example, reference is made to FIG. 1 at the same time. When a supply voltage value VDD of the transistor 130 is less than a supply voltage threshold value, a path P1 of the switch 150 is selected, and a switch voltage value VSEL with the voltage value VSS is transmitted to the transistor 130A through the path P1. In some embodiments, when the transistor 130A is a p-type transistor and the voltage value VSS is 0, the transistor 130 is fully conducted, and an output voltage value VOUT is equal to the supply voltage value VDD.

In operation S430, transmitting a second switch voltage value to the first transistor so as to turn off the first transistor when the supply voltage value is not less than the supply voltage threshold value, so that the output voltage value is adjusted by a second transistor and an amplifier. In some embodiments, operation S430 may be operated by the switch 150 as illustrated in FIG. 2.

For example, reference is made to FIG. 1 at the same time. When the supply voltage value VDD of the transistor 130 is not less than the supply voltage threshold value, a path P0 of the switch 150 is selected, and a switch voltage value VSEL with the supply voltage value VDD is transmitted to the transistor 130A through the path P0. In some embodiments, when the transistor 130A is a p-type transistor, the transistor 130A is turned off, and the output voltage value VOUT is adjusted by the amplifier 110 and the transistor 130B.

According to the embodiment of the present disclosure, it is understood that the embodiments of the present disclosure are to provide a low dropout regulator and a control method thereof, so as to maintain the LDO output voltage value when the supply voltage value is close to the target LDO output voltage value. By using a selector to control the voltage value input to the gate terminal of the pass transistor, such as the transistor 130A illustrated in FIG. 1, of the LDO, the pass transistor 130A may be fully conducted, and the output voltage value VOUT is equal to the supply voltage value VDD when the supply voltage value VDD is close to the target output voltage value. When the load condition of the LDO is heavy, the pass transistor is also capable of providing an output voltage value VOUT with small error. Furthermore, when the control voltage value VCON of the selector 130 is changed and the path selected is changed from the path P1 to path P0, the pass transistor 130A if turned off and the output voltage value VOUT is regulated by the amplifier 110 and the pass transistor 130B, so that a big drop of the output voltage value VOUT during the change of the path may not be induced.

Although the present disclosure has been described in considerable detail with reference to certain embodiments thereof, other embodiments are possible. Therefore, the spirit and scope of the appended claims should not be limited to the description of the embodiments contained herein.

In addition, the above illustrations comprise sequential demonstration operations, but the operations need not be performed in the order shown. The execution of the operations in a different order is within the scope of this disclosure. In the spirit and scope of the embodiments of the present disclosure, the operations may be increased, substituted, changed and/or omitted as the case may be.

It will be apparent to those skilled in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. A low dropout regulator, comprising:
   an amplifier;
   a first transistor;
   a second transistor, coupled to the amplifier and the first transistor; and
   a switch, coupled to the first transistor, wherein when a supply voltage value of the low dropout regulator is less than a supply voltage threshold value, a first path of the switch is selected and a first switch voltage value is transmitted to the first transistor so as to fully conduct the first transistor, and an output voltage value of the low dropout regulator is equal to the supply voltage value, wherein when the supply voltage value is not less than the supply voltage threshold value, a second path of the switch is selected and a second switch voltage value is transmitted to the first transistor so as to turn off the first transistor, and the output voltage value is adjusted by the second transistor and the amplifier, wherein when the output voltage value is less than an output voltage threshold value, an amplifier output value input to the second transistor decreases.

2. The low dropout regulator of claim 1, wherein the first switch voltage value is 0, and the second switch voltage value is the supply voltage value.

3. The low dropout regulator of claim 1, wherein the first transistor and the second transistor are PMOS transistors.

4. The low dropout regulator of claim 1, wherein when the output voltage value is not less than the output voltage threshold value, the amplifier output value input to the second transistor increases.

5. The low dropout regulator of claim 4, wherein a first input end of the amplifier receives the output voltage threshold value, a second input end of the amplifier receives the output voltage value, and an output end of the amplifier outputs the amplifier output value.

6. The low dropout regulator of claim 4, wherein when the amplifier output value input to the second transistor decreases, the output voltage value increases, and when the amplifier output value input to the second transistor increases, the output voltage value decreases.

7. A control method of a low dropout regulator, comprising:
   transmitting a first switch voltage value to a first transistor so as to fully conduct the first transistor when a supply voltage value is less than a supply voltage threshold value, so that an output voltage value is equal to the supply voltage value;
   transmitting a second switch voltage value to the first transistor so as to turn off the first transistor when the supply voltage value is not less than the supply voltage threshold value, so that the output voltage value is adjusted by a second transistor and an amplifier; and
   decreasing an amplifier output value input to the second transistor when the output voltage value is less than an output voltage threshold value.

8. The control method of claim 7, wherein the first switch voltage value is 0 and the second switch voltage value is the supply voltage value.

9. The control method of claim 7, further comprising:
   selecting a first path of a switch so as to transmit the first switch voltage value to the first transistor; and selecting a second path of the switch so as to transmit the second switch voltage value to the second transistor.

10. The control method of claim 7, wherein adjusting the output voltage value by the second transistor and the amplifier further comprising:

increasing the amplifier output value input to the second transistor when the output voltage value is not less than the output voltage threshold value.

11. The control method of claim 10, wherein a conductivity level of the second transistor is in inverse proportional to the amplifier output value.

12. The control method of claim 10, further comprising:

receiving the output voltage threshold value by a first end of the amplifier;

receiving the output voltage value by a second end of the amplifier; and outputting the amplifier output value according to the output voltage value and the output voltage threshold value.

13. The control method of claim 12, further comprising:

increasing the output voltage value when the amplifier output value decreases; and decreasing the output voltage value when the amplifier output value increases.

* * * * *